United States Patent
Leonidov et al.

(10) Patent No.: US 7,039,182 B1
(45) Date of Patent: May 2, 2006

(54) ECHO CANCELLER HAVING IMPROVED NOISE IMMUNITY

(75) Inventors: Alexandre L. Leonidov, Skokie, IL (US); Vladimir G. Parizhsky, New York, NY (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/322,512

(22) Filed: May 28, 1999

(51) Int. Cl.
*H04M 1/00* (2006.01)

(52) U.S. Cl. .......................... 379/406.05; 379/406.03; 379/406.08

(58) Field of Classification Search ........... 379/406.01, 379/406.02, 406.03, 406.04, 406.05, 406.06, 379/406.07, 406.08; 708/300, 322, 323
See application file for complete search history.

(56) References Cited

U.S. PATENT DOCUMENTS

| | | | |
|---|---|---|---|
| 5,307,405 A | | 4/1994 | Sih |
| 5,455,819 A | | 10/1995 | Sugiyama |
| 5,559,881 A | | 9/1996 | Sih |
| 5,592,548 A | | 1/1997 | Sih |
| 5,631,900 A | * | 5/1997 | McCaslin et al. ...... 379/406.08 |
| 5,675,644 A | | 10/1997 | Sih |
| 5,687,229 A | | 11/1997 | Sih |
| 5,790,632 A | | 8/1998 | Antonio et al. |
| 5,796,820 A | * | 8/1998 | Sasada .................. 379/406.08 |
| 6,181,794 B1 | * | 1/2001 | Park et al. ............ 379/406.08 |
| 6,442,273 B1 | * | 8/2002 | Okuda ................... 379/406.03 |
| 6,507,652 B1 | * | 1/2003 | Laberteaux ........... 379/406.05 |

FOREIGN PATENT DOCUMENTS

| | | | |
|---|---|---|---|
| JP | A8-265222 | * | 10/1996 |
| WO | WO99/14867 | * | 3/1999 |

* cited by examiner

*Primary Examiner*—Jefferey F. Harold
(74) *Attorney, Agent, or Firm*—McDonnell Boehnen Hulbert & Berghoff LLP

(57) ABSTRACT

Methods and systems pertaining to preventing the corruption of filter coefficients due to near end speech in an echo canceller that uses an adaptive filter to create a local replica of an echo signal are provided. In accordance with a preferred method, a far end signal is received and the presence of near end speech is indicated. A filter coefficient vector is updated, and copies of the filter coefficient vector are periodically stored. A stored copy of the filter coefficient vector is recovered for use in the echo canceller. Further, an improved echo canceller that prevents the corruption of filter coefficients due to near end speech, having a near end speech indicator, a first buffer, a filter, and a second buffer connected to the filter, is provided. The first buffer receives a far end signal. The filter is responsive to the first buffer and the near end speech indicator. The filter includes a filter coefficient vector generator, wherein the generator generates, updates, and provides copies of filter coefficient vectors. The second buffer is connected to the filter and stores the copies of the filter coefficient vectors for restoration to the filter.

20 Claims, 8 Drawing Sheets

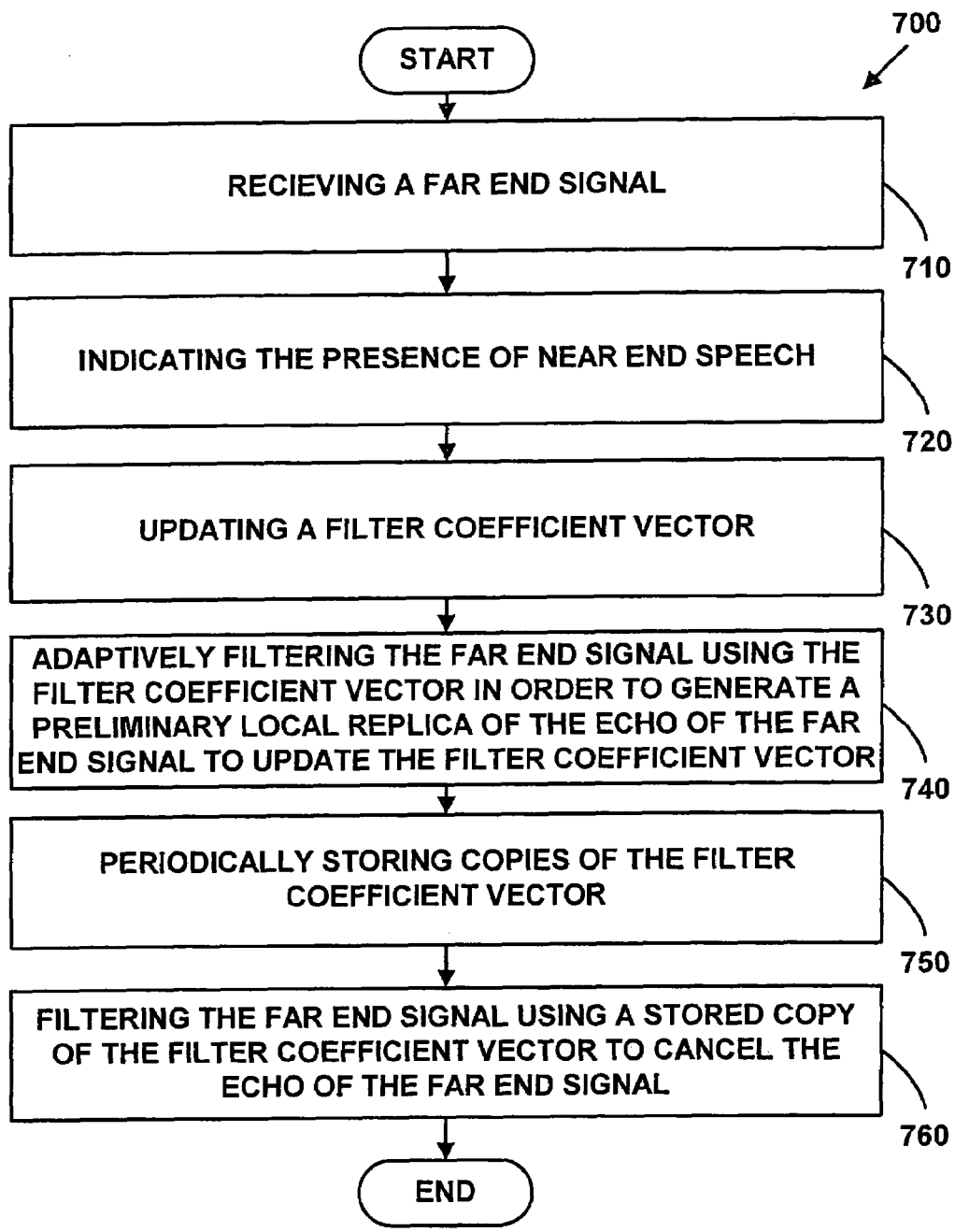

ECHO CANCELLER HAVING IMPROVED NOISE IMMUNITY

FIELD OF INVENTION

The present invention relates to communications networks. More specifically, it relates to methods and systems for preventing the corruption of filter coefficients due to near end speech in an echo canceller that creates a local replica of an echo signal to cancel the echo signal.

BACKGROUND OF THE INVENTION

The central offices of Public Switched Telephone Networks employ network hybrids to interface analog subscribers to the local exchange. Typically, a 2-wire full-duplex line connects the subscriber to the central office while the network hybrid provides an interface to the two 2-wire simplex digital transmission network. In this way, data are transmitted to and received from other subscribers who are connected via a 2-wire line to the digital transmission network by another hybrid at the local exchange.

As is known in the art, echo cancellation is often discussed with reference to speech signal communication between a "near end" and a "far end" and vice versa. A person speaking at the "far end" of a telephone connection has her speech sent over the digital transmission network to a person listening (and eventually speaking) at the "near end." A portion of the speech signal that is transmitted from the far end speaker "echoes" off of the network hybrid that is farther away from the far end speaker and closer to the person located at the near end (the near end speaker). In this way, the "near end" hybrid creates an unwanted signal echo of the transmitted far end speech signal and sends it back toward the far end, only to be heard by the far end speaker as an annoying echo of her own voice.

As is known in the art, network echo canceller circuitry is located at both network hybrids (one at the "far end," and one at the "near end"). In the case of far end speaker echo, that is, the echo of a transmitted far end speech signal back to the far end, a network echo canceller at the far end network hybrid (the hybrid closest to the far end speaker) is used to cancel the echo. The echo canceller at the far end generates a local replica of the echo generated by the far end signal as it passes through an echo path, or echo channel at the near end. This local replica of the echo is generated and used by the echo canceller to attempt to cancel the echo before it returns to the far end speaker. The echo path or channel is the entire path traveled by the transmitted far end signal as it leaves the far end hybrid, as a portion of it echoes off of the near end hybrid, and as its echo returns back to the far end hybrid. In particular, the echo path represents the outgoing and incoming digital transmission lines as well as the near end network hybrid (the one closest to the near end speaker, and distant from the far end speaker).

Similarly, in the case of echo from the near end speaker, that is, the echo of a transmitted near end speech signal back to the near end, a network echo canceller at the near end network hybrid (the hybrid closest to the near end speaker) cancels the echo that is generated from a portion of the near end speech signal echoing off of the opposite hybrid (the far end hybrid) and that returns toward the network hybrid closest to the near end (the near end hybrid).

A typical network echo canceller employs an adaptive digital transversal filter to model the impulse response of the unknown echo channel so that the echo signal can be cancelled. The echo impulse response coefficients used in the transversal filter are updated to track the characteristics of the unknown echo channel. For reference purposes, network echo cancellers are examined from the point of view of the far end speaker, that is, these cancellers act to minimize far end echo.

Generally speaking, the presence of near end speech interferes with the ability of the adaptive transversal filter of the network echo canceller to properly and accurately model the characteristic response of the unknown echo channel via the coefficient updating process. Near end speech is present when only the near end speaker is talking or when the near end speaker and the far end speaker are conversing simultaneously. This latter situation is referred to as "doubletalk." If speech is present from the near end speaker, this speech will be combined with any far end speaker echo that is present and will be sent toward the echo canceller at the far end telephone company central office. This near end speech poses a problem for coefficient updating and adaptation of the digital transversal filter.

If coefficient updating is allowed to continue while near end speech is present, the updated echo impulse response coefficients will no longer reflect the characteristic response of the echo channel. The filter coefficients will instead be corrupted by the samples of the near end speech signal samples that are now combined with the samples of the far end echo signal.

Prior attempts at avoiding or limiting the corruption of the echo impulse response or filter tap coefficients due to the presence of near end speech have involved techniques such as freezing or disabling digital filter adaptation when near end speech is detected, indicated, or declared. These techniques imply that the network echo canceller includes a near end speech detector or indicator. There is a delay time associated with near end speech indication that is significant since the adaptive transversal filter is not immediately disabled and/or the filter tap coefficients are not frozen in time to avoid corruption.

Needed is a computationally efficient and easily implemented technique to preserve and protect the echo impulse coefficients used in adaptive transversal filtering from corruption and distortion due to the presence of near end speech and to compensate for the delay time associated with the detection or indication of the near end speech.

SUMMARY OF THE INVENTION

In accordance with preferred embodiments of the present invention, some of the problems associated with performing echo cancellation while a near end speech signal is present are addressed.

A method for preventing the corruption of filter coefficients due to near end speech in an echo canceller that uses an adaptive filter to create a local replica of an echo of a far end signal is provided. In accordance with the exemplary method, a far end signal is received and the presence of near end speech is indicated. A filter coefficient vector is updated, and copies of the filter coefficient vector are periodically stored. A stored copy of the filter coefficient vector is recovered for use in the echo canceller.

Further, a second method for preventing the corruption of filter coefficients due to near end speech in an echo canceller that uses more than one filter to create a local replica of an echo of a far end signal is provided. In accordance with the second exemplary method, a far end signal is received and the presence of near end speech is indicated. A filter coefficient vector is updated, and the far end signal is adaptively filtered using the filter coefficient vector in order to generate a preliminary local replica of the echo of the far end signal. Copies of the filter coefficient vector are periodically stored, and the far end signal is filtered using a stored copy of the filter coefficient vector to cancel the echo of the far end signal.

An improved echo canceller that prevents the corruption of filter coefficients due to near end speech, having a near end speech indicator, a first buffer, a filter, and a second buffer connected to the filter, is provided. The first buffer receives a far end signal. The filter is responsive to the first buffer and the near end speech indicator. The filter includes a filter coefficient vector generator, wherein the generator generates, updates, and provides copies of filter coefficient vectors. The second buffer is connected to the filter and stores the copies of the filter coefficient vectors for restoration to the filter.

A still further embodiment includes a second improved echo canceller that prevents the corruption of filter coefficients due to near end speech, having a near end speech indicator, a first and a second buffer, and a first and a second filter. The first buffer receives a far end signal. The first filter is responsive to the first buffer and adaptively filters the far end signal to drive a filter coefficient vector generator, wherein the generator generates, updates, and provides copies of filter coefficient vectors. The second filter is responsive to the first buffer and filters the far end signal to cancel an echo of the far end signal. The second buffer is connected to the first filter and is responsive to the near end speech indicator. The second buffer stores the copies of the filter coefficient vectors for use in the second filter.

The foregoing and other features and advantages of preferred embodiments of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein:

FIG. 8 is a flow diagram illustrating a second method for preventing the corruption of filter coefficients due to near end speech in an echo canceller.

DETAILED DESCRIPTION OF PREFERRED EMBODIMENTS

The central offices of Public Switched Telephone Networks employ network hybrids to interface analog subscribers to the local exchange. Typically, a 2-wire full-duplex line connects the subscriber to the central office while the network hybrid provides a link to the two 2-wire simplex digital transmission network. In this way, data are transmitted to and received from other subscribers who are connected via a 2-wire line to the digital transmission network by another hybrid at the local exchange.

Figure 1:
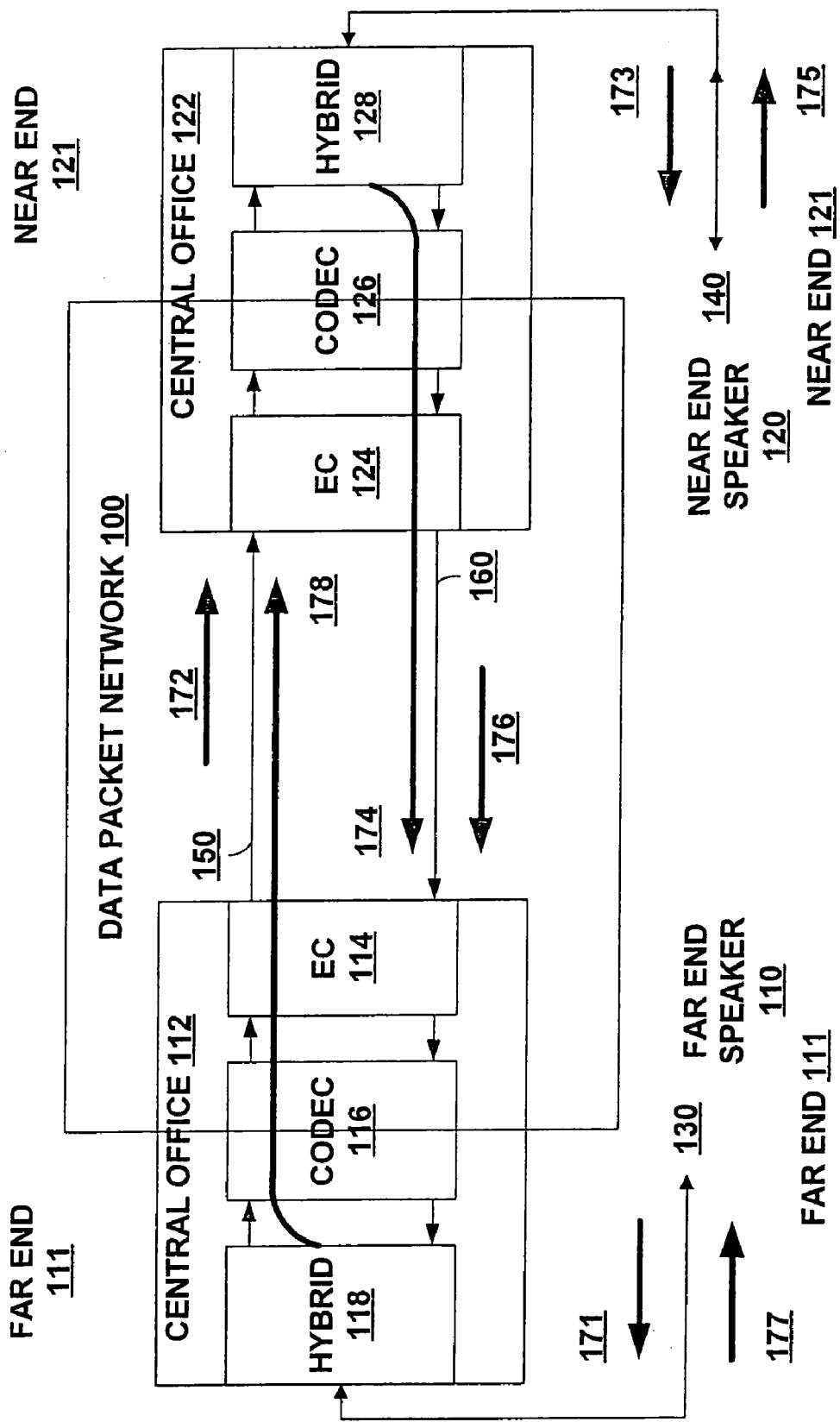
FIG. 1 is a block diagram illustrating communication over an exemplary digital transmission network between a far end speaker and a near end speaker.

FIG. 1 is a block diagram illustrating communication over an exemplary digital transmission network or Data Packet Network ("DPN") 100 between a person speaking at the "far end" 111 of a telephone connection and a speaker at the "near end" 121 (for example). Telephone company Central Offices 112, 122 include among other items not shown in FIG. 1, network Echo Cancellers ("ECs") 114, 124; Codecs 116, 126; and Hybrids 118, 128, respectively. A Far End Speaker 110, communicating with a Near End Speaker 120, transmits an analog speech signal 171 along a far end 2-wire full duplex line 130 to the Central Office 112. The Hybrid 118 at the Central Office 112 closest to the far end 111 interfaces the 2-wire line 130 with a pair of 2-wire simplex lines, 150 (outgoing from the far end 111) and 160 (incoming to the far end 111). The analog speech signal 171 is converted to a digital signal 172 by the Codec 116 also located at the far end Central Office 112. The far end side of the DPN 100 can be defined as the point at which the analog signal 171 is converted to the digital signal 172. The digital signal 172 is received by the EC 114 before exiting the Central Office 112.

The digital signal 172 travels along the 2-wire simplex line 150 through the DPN 100 to the Central Office 122 nearest to the near end. The digital signal 172, after passing through the EC 124, is converted to an analog signal 173 by the Codec 126 located at the Central Office 122. The near end side of the DPN 100 can be defined as the point at which the digital signal 172 is converted to the analog signal 173. The analog signal 173 sent by the Far End Speaker 110 exits the Central Office 122 and travels toward the near end 121 and the Near End Speaker 120 along a 2-wire full duplex line 140.

The network Hybrid 128 that is farthest away from the far end 111 and closest to the near end 121 will create an echo (shown as signal arrow 174 in FIG. 1) of the signal 172 (171) transmitted from the Far End Speaker 110. In this example, this unwanted echo signal 174 is transmitted back across the DPN 100 along a 2-wire simplex line 160 to the far end 111 so that the Far End Speaker 110 hears an annoying echo of her own speech.

As is known in the art, network echo canceller circuitry (EC 114, 124) is located at both Central Offices 112, 122. To cancel the echo signal 174 from the Far End Speaker 110, that is, to cancel the unwanted echo 174 of the transmitted far end speech 172 (171) back toward the far end 111, the EC 114 is located at the Central Office 112 closest to the Far End Speaker 110, as is typically the case. The EC 114 provides and adaptively generates a local replica (not shown in FIG. 1) of the echo signal 174 by modeling the impulse response of the echo path. The echo path or echo channel presented to the far end signal 172 and its far end echo 174 include the outgoing and incoming digital transmission lines (2-wire simplex lines 150 and 160, respectively) and the network Hybrid 122 located closest to the near end 121. The local replica of the echo is used by the EC 114 at the far end Central Office 112 to attempt to cancel the echo before it returns to the Far End Speaker 110.

The echo cancellation process for speech transmitted from the near end 121 proceeds in a similar fashion, but from an opposing perspective. The Near End Speaker 120 transmits an analog speech signal 175 to the Central Office 122. The analog signal 175 passes through Hybrid 128 and is converted to a digital signal 176 by the Codec 126. The digital signal 176 is received into the EC 124 prior to exiting the near end Central Office 122 and traveling along the line 160 to the far end 111. The digital signal 176 is ultimately converted to an analog signal 177 by the Codec 116 at the far end Central Office 112 and is sent to the far end along line 130. A portion, however, of the transmitted near end speech signal 176 (175) echoes off of the network Hybrid 118 closest to the far end 111 as echo signal 178, and returns toward the near end Central Office 122. The EC 124 located at the near end Central Office 122 closest to the Near End Speaker 120 cancels the echo signal 178 that is generated from the speech signal 176 (175) that is transmitted from the near end.

As regards the pair of signals 172, 178 traveling on the 2-wire simplex line 150 and the pair of signals 176, 174 traveling on the 2-wire simplex line 160, it should be understood that the signals within each combined pair were discussed in isolation from each other for clarity of explanation. For example, the signals 172 and 178 are components of the same signal.

For reference purposes and as is known in the art, network echo cancellers can be examined from the point of view of the Far End Speaker 110. That is, an echo canceller minimizes the far end echo so that the Far End Speaker 110 does not hear a noticeable echo of her own voice. Of course, the reverse proposition is true, and the canceller on the opposite end can be examined from the point of view of the Near End Speaker 120, as is evident from the discussion of FIG. 1.

Figure 2:
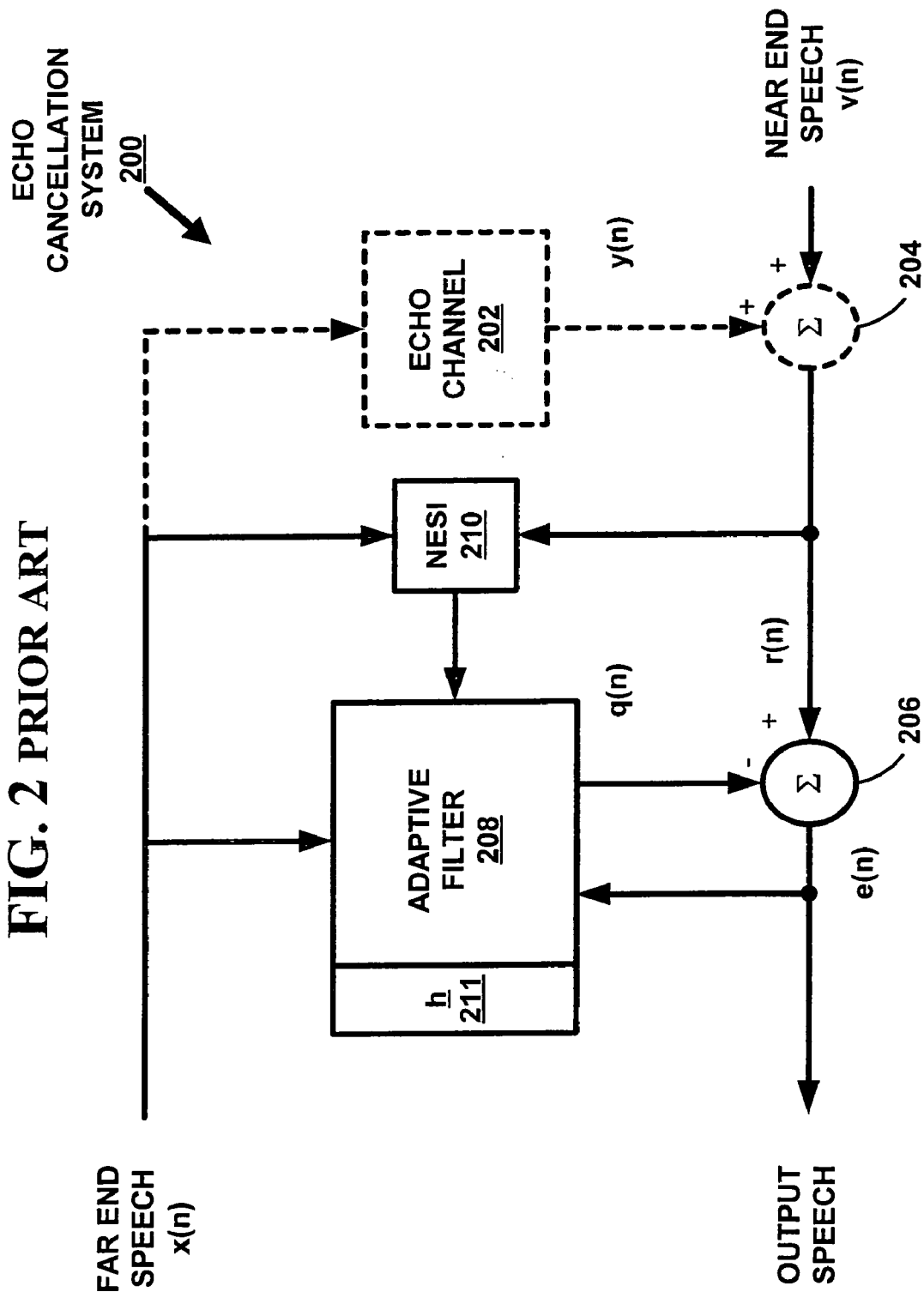
FIG. 2 is a block diagram illustrating an exemplary echo cancellation system.

FIG. 2 is a block diagram illustrating an exemplary echo cancellation system 200. It should be understood that the echo cancellation system 200 of FIG. 2 is analogous to the EC 114 of FIG. 1, with the exception of the dotted lines and elements, and can be viewed instructively with reference to FIG. 1.

All signals discussed with reference to FIG. 2 are sampled signals of the form (for example) "a(n)". Although a signal is referred to as the "signal a(n)," it should be understood that "a(n)" can also represent the current sample value of the signal a(n) at an instant n, and that the signal a(n) under discussion may include, for example, a plurality of samples occurring prior to a(n), (i.e. a(n−1), a(n−4), etc.).

An incoming far end speech signal x(n) (analogous to signal 172 in FIG. 1) enters an unknown Echo Channel 202 that is intended to model the entire echo path of the far end speech signal (see signals 172, 174 in FIG. 1). A far end echo signal y(n) (see 174 in FIG. 1) is "generated" from x(n) by the unknown Echo Channel 202 and is output by the Echo Channel 202. The unknown Echo Channel 202 is not an actual functional block; rather it is a model of the echo phenomenon. The far end echo created by the far end network hybrid (see Hybrid 128 in FIG. 1) and the Echo Channel 202 do exist, yet the characteristic response of the echo channel and the values of the far end echo are not known a priori and must be estimated in order for echo cancellation to be effective.

An incoming near end speech signal v(n) (see 176 in FIG. 1) is summed with the far end echo signal y(n) at a Summer 204 to produce a signal r(n) (signal 174 plus signal 176). A high-pass filter (not shown) might follow the Summer 204 to remove low-frequency signal components and background noise present in the signal r(n), i.e. the sum of y(n) and v(n). The Summer 204 is not an actual physically implemented summer, rather it models the combination of the far end signal echo with the near end speech. Generally, unless both the Far End Speaker 110 and the Near End Speaker 120 of FIG. 1 are talking at the same time (doubletalk), only one of y(n) or v(n) will be present and/or significant relative to the other. The echo cancellation system 200 cancels the echo y(n) out of the signal r(n) so that the Far End Speaker 110 of FIG. 1 does not hear an echo of her own voice. The near end speech signal v(n) component of the signal r(n) is at worst an impediment to and is at best not advantageous to this end, the cancellation of the far end echo y(n).

An Adaptive Filter 208 having an impulse response coefficient vector h 211 generates a local replica q(n) of the far end speaker echo y(n) to cancel the echo y(n) through the unknown echo channel 202 of FIG. 2. The Adaptive Filter 208 outputs the local replica of the echo y(n), the echo estimate signal q(n). The echo estimate signal q(n) is subtracted from the signal r(n) at a subtract input of a Summer 206 to yield an echo residual signal e(n). The echo residual signal e(n) is the output speech of the echo canceller or echo cancellation system 200. A filter, attenuator, or other non-linear frequency component shaping system block (not shown) may be used to adjust, attenuate or clip the echo residual signal e(n) as desired. That is, the local replica q(n) generated by the Adaptive Filter 208 might not cancel the far end echo signal y(n) in the signal r(n) completely, requiring some adjustment to the echo residual signal e(n).

The Adaptive Filter 208 of FIG. 2 receives the incoming far end speech signal x(n), the echo residual signal e(n), and a control or indication signal from a Near End Speech Indicator ("NESI") 210 (described below). The Adaptive Filter 208 of FIG. 2, typically implemented as an adaptive digital transversal filter, is used to model the impulse response of the unknown Echo Channel 202 so that the echo signal y(n) can be cancelled. The vector h 211 of echo impulse response coefficients used in the Adaptive Filter 208 is updated according to an algorithm or scheme that extracts information about the unknown echo channel 202 from the signals x(n) and e(n), for example. The coefficients of the coefficient vector h 211 are progressively updated in order to track the characteristics of the unknown echo channel 202.

Generally speaking, the presence of near end speech interferes with the ability of the Adaptive Filter 208 to properly and accurately model the characteristic response of the unknown echo channel 202 via the coefficient updating process. Near end speech is present when only the Near End Speaker 120 is talking or when the Near End Speaker 120 and the Far End Speaker 110 are conversing simultaneously. As is known in the art, this latter situation is referred to as "doubletalk." If speech is present from the Near End Speaker 120, this speech signal v(n) will be combined with any far end speaker echo y(n) that is present and will be sent toward the echo canceller at the far end Central Office 112 of FIG. 1. This near end speech poses a problem for coefficient updating and adaptation of the Adaptive Filter 208.

If coefficient updating is allowed to continue while near end speech is present, the updated echo impulse response coefficients will no longer reflect the characteristic response of the echo channel 202. The coefficients will instead be corrupted by the samples of the near end speech signal v(n) that are now combined with the (unknown) samples of the far end echo signal y(n).

Prior attempts at avoiding or limiting the corruption of the echo impulse response or filter tap coefficients due to the presence of near end speech have involved techniques such as freezing or disabling digital filter adaptation when near end speech is detected, indicated or declared.

These techniques typically employ a near end speech detector or indicator, the NESI 210.

The NESI 210 of FIG. 2 receives the incoming far end speech signal x(n) and the signal r(n) (the combination of y(n) and v(n)) and detects the presence of near end speech from the samples of these signals. The NESI 210 provides a control signal that is indicative of the presence of near end speech to the Adaptive Filter 208. A Doubletalk Detector (not shown in FIG. 2) may also be used to detect and provide an indication of "doubletalk."

Figure 3:
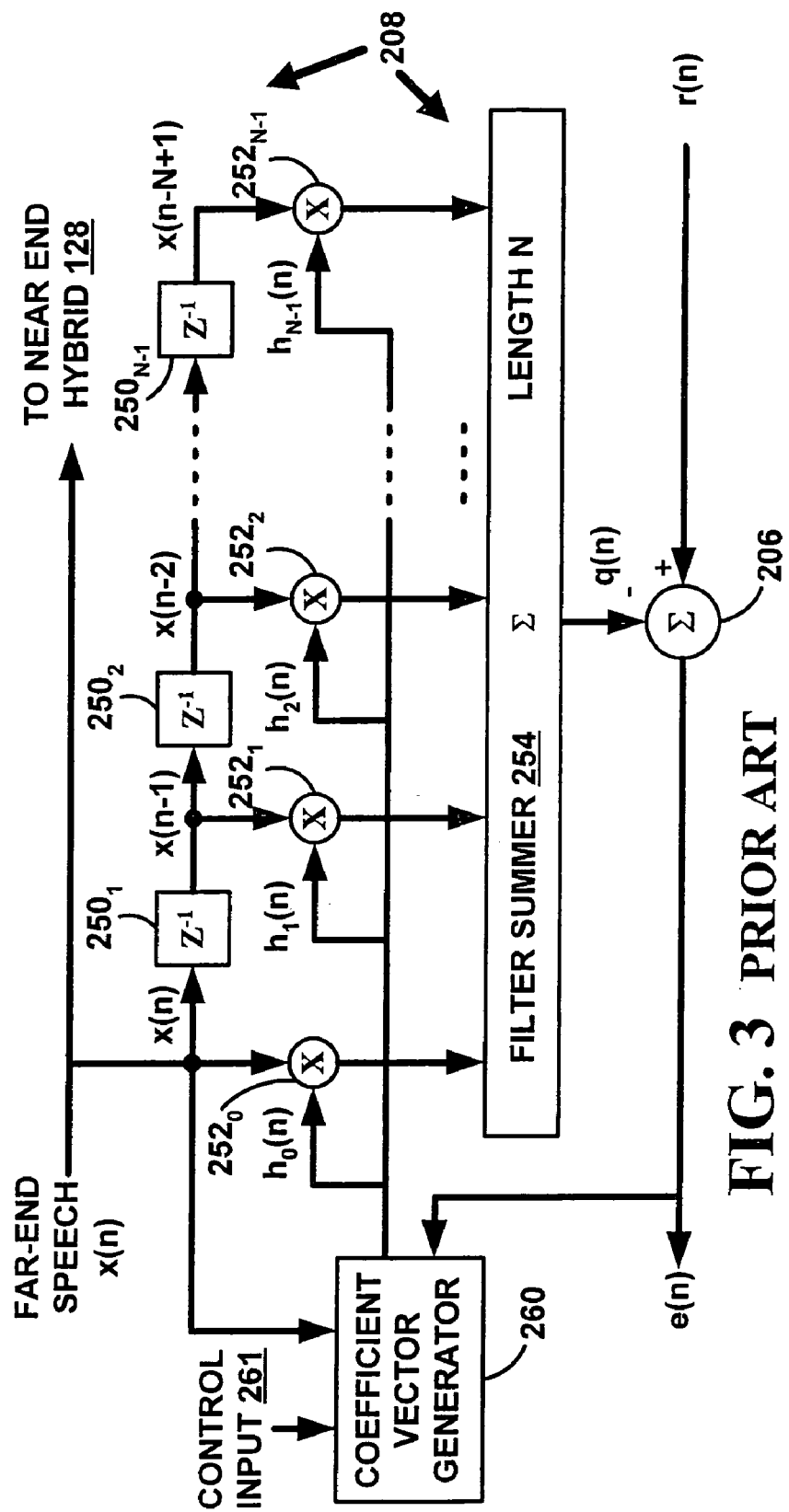
FIG. 3 is a block diagram illustrating an exemplary adaptive transversal filter for use in the echo cancellation system of FIG. 2.

FIG. 3 is a block diagram illustrating an exemplary adaptive transversal filter for use in the echo cancellation system 200 of FIG. 2. In particular, the adaptive transversal filter is an implementation of the Adaptive Filter 208 of FIG. 2. The samples of the far end speech signal x(n) heading toward the near end Hybrid 128 are received into a delay line of N−1 block delay elements 250 so that a series of delayed samples of the signal x(n) are presented to the adaptive transversal filter. These N−1 delayed samples, and one current valued sample, can be expressed as a vector $\underline{x}$:

$$\underline{x}(n) = \langle x(n), x(n-1), x(n-2), \ldots, x(n-N+1) \rangle \quad (1).$$

A Coefficient Vector Generator ("CVG") 260 in FIG. 3 updates a vector h (analogous to vector h 211 of FIG. 2) of echo impulse response coefficients or transversal filter taps according to an algorithm or scheme that extracts information about the unknown echo channel 202 of FIG. 2 from the sampled signals x(n) and e(n), for example. The vector $\underline{h}$ 211 has N impulse response coefficient or filter tap values:

$$\underline{h}(n) = \langle h_0(n), h_1(n), h_2(n), \ldots, h_{N-1}(n) \rangle \quad (2).$$

The coefficients of the coefficient vector $\underline{h}$ 211 in equation (2) are progressively updated in order to track the characteristics of the unknown echo channel 202 of FIG. 3. As is familiar to those in the art, a Least-Mean Square adaptation algorithm or method is typically used to update the echo impulse response coefficient vector $\underline{h}$ 211.

As described above, the Adaptive Filter 208 shown in FIG. 2 (and implemented in FIG. 3) outputs and generates the echo estimate signal q(n) of the far end speaker echo y(n) to cancel the echo y(n) through the unknown echo channel 202 of FIG. 2. The samples of the far end signal vector $\underline{x}(n)$ in equation (1) and the coefficients of the coefficient vector h(n) 211 in equation (2) are multiplied together in a set of N Multipliers 252 and summed together in a Filter Summer 254 of length N as shown in FIG. 3 to arrive at the echo estimate signal q(n) according to:

$$q(n) = \sum_{i=0}^{N-1} x(n-i) h_i(n) \quad (3)$$

for the current sample of q(n). The echo estimate signal q(n) is subtracted from the signal r(n) at a subtract input of the Summer 206 to yield an echo residual signal e(n), as shown in FIGS. 2 and 3.

Referring to FIGS. 2 and 3, for each new sample x(n) of the far end speech signal x(n), the previous samples of the signal x(n) are shifted through the delay line (or buffer, if applicable). The filter coefficient vector 211 $\underline{h}$(n−1) is potentially updated to h(n) (if near end speech is not indicated, for example) typically according to an algorithm using the prior value of the $\underline{x}$(n) vector ($\underline{x}$(n−1)) and the prior value of the echo residual signal, e(n−1). Finally, a new value of the echo estimate signal q(n) is created to cancel the far end echo y(n) component of the signal r(n) and is subtracted from r(n) at Summer 206 to yield the new value of the echo residual signal, e(n).

Although a delay line of block delay elements 250 is shown in FIG. 3, other implementations for receiving the far end signal x(n) are used, including providing a series of samples longer than the length N of the transversal filter into a buffer (not shown in FIG. 2 or 3). The buffer (not shown) may or may not be a separate element from the adaptive transversal filter of FIG. 3 or the Adaptive Filter of FIG. 2. A buffer implemented to receive samples of the far end signal x(n) typically will be at least as long as the adaptive filter length N.

As described above, the NESI 210 provides a control signal that is indicative of the presence of near end speech to the Adaptive Filter 208. The CVG 260 of FIG. 3 is responsive to this Control Input 261 which originates from the NESI 210. Generally, if the NESI 210 detects, indicates, or declares the presence of near end speech, the CVG 260 will freeze adaptation of the transversal filter, or stop updating the echo impulse response coefficient or filter tap vector $\underline{h}$ 211 for the duration of the period that near end speech is detected, indicated or declared.

Regardless, of primary importance is that the presence of near end speech is detected, indicated or declared. An algorithm that is employed in the art detects, indicates, or declares the presence of near end speech according to the following condition:

$$|r(n)| \geq \frac{1}{2} \max\{|x(i)|, |x(i-1)|, \ldots, |x(i-N+1)|\} \quad (4)$$

where:
r(n) is the combined far end echo (y(n)) and near end signal (v(n));
x(i) is the incoming far end speech signal, and x(i) can be equivalent to x(n) (i=n); and
N is the length of an echo canceller block delay line or a buffer into which samples of the incoming far end speech signal x(n) are received.

Whenever the condition of equation (4) is met, the presence of near end speech is indicated by the NESI 210. While comparing the latest value of the combined signal r(n) with the maximum sample of a series of delayed or buffered samples of the far end signal x(n) is one technique, it is possible to increase the robustness of and ensure the reliability of the near end speech detection. Preferably, instead of the samples of r(n) and x(n), the short term averages of a series of samples of the signals r(n) and x(n) are used in the near end speech indication condition in equation (4).

Other near end speech and doubletalk detection techniques exist in the art such as the monitoring of the echo return loss enhancement (ERLE) measurement.

Figure 4:
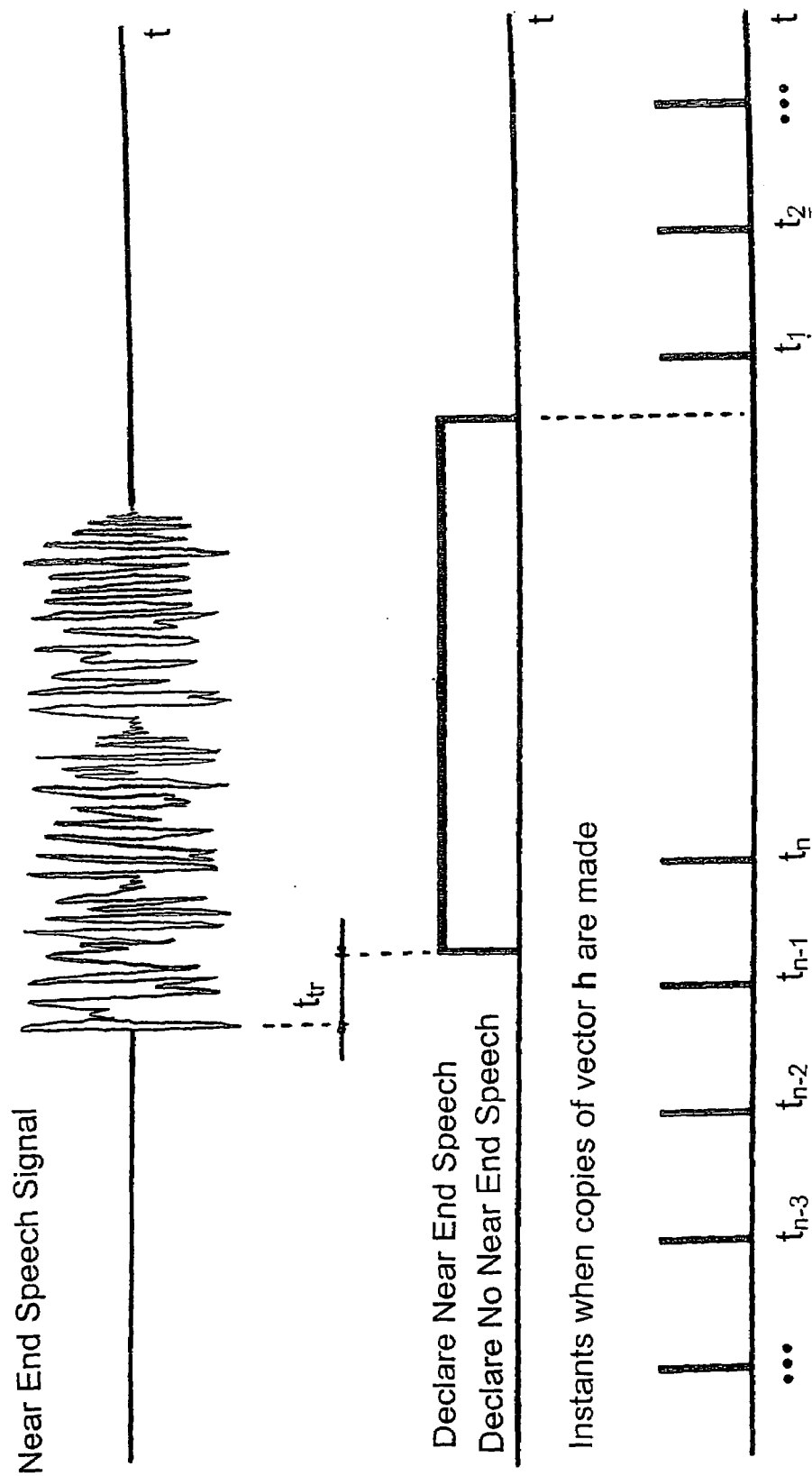
FIG. 4 is an illustration of timing diagrams for a near end speech signal, a near end speech detector indication signal, and a process of the preferred embodiments.

FIG. 4 is an illustration of timing diagrams for a near end speech signal, a near end speech detector indication signal, and a process of the preferred embodiments described herein. A Near End Speaker 120 (of FIG. 1) begins speaking and the resulting near end speech signal is shown at the top of FIG. 4. The near end speech detection indication signal shown in the middle of figure is "high" when near end speech is declared and "low" when no near end speech is declared. However, a lag or near end speech indication delay time $t_{tr}$ is present from the point at which the Near End Speaker 120 begins speaking to the instant at which the indication signal goes "high" and near end speech is declared.

Referring to FIG. 4, the near end speech indication delay time $t_{tr}$ can generally be defined as the time required for the particular detection, indication, or declaration algorithm to provide an indication of the presence of near end speech that can be used by the Adaptive Filter 208 (FIG. 2). The near end speech indication delay time $t_{tr}$ is significant because the Adaptive Filter 208 is not immediately disabled and/or the filter tap coefficients are not frozen in time to avoid corruption. For this reason, a filter, attenuator, or other non-linear frequency component shaping system block (not shown in FIG. 2) may follow the Summer 206 as described above in order to offset any adverse effects of the corruption on the echo residual signal e(n).

Needed is a computationally efficient and easily implemented technique to preserve and protect the echo impulse coefficients used in adaptive transversal filtering from corruption and distortion due to the presence of near end speech and to compensate for the delay time associated with the detection or indication of the near end speech.

Methods and systems for preventing the corruption of filter coefficients due to near end speech in an echo canceller that create a local replica of an echo signal to cancel an echo signal are presented.

The lower portion of FIG. 4 illustrates a timing diagram exhibiting the instants $t_n$ at which copies of the echo impulse response coefficient vector $\underline{h}$ (analogous to vector $\underline{h}$ 211 of FIG. 2) are made by processes of the present embodiment. These individual copies of the vector $\underline{h}$ are stored, preserved, or protected as coefficient vector copies for potential use by the echo canceller at the onset of near end speech or as the presence of near end speech is indicated.

As described above, the Adaptive Filter 208 is not immediately disabled and/or the filter tap coefficients are not frozen in time to avoid some corruption and possible divergence due to the near end speech indication delay time $t_{tr}$. A filter tap coefficient vector $\underline{h}$ copy made at the instant $t_n$ will not necessarily be free of corruption from the near end speech, nor will a copy of vector $\underline{h}$ made at $t_{n-1}$. The copy of the vector h made at $t_{n-2}$, or prior to the onset of the near end speech, however, may not suffer or experience the effects of the near end speech and can be utilized by a filter (such as the Adaptive Filter 208 of FIGS. 2 and 3) to generate the local replica or echo estimate signal q(n) of FIG. 2 for the duration of the near end speech or while near end speech is indicated, detected or declared.

It should be understood with regard to the methods and systems presented that indicating the presence of near end speech hereafter refers to any process, method, step, or algorithm, however implemented, of indicating, detecting, declaring, or monitoring the presence, existence, or onset of near end speech, a near end speech signal, a "near end speech" state or condition, a "doubletalk" state or condition, or any signal that interferes with the cancellation of far end speaker echo and whose presence requires detection, indication or declaration.

Figure 5:
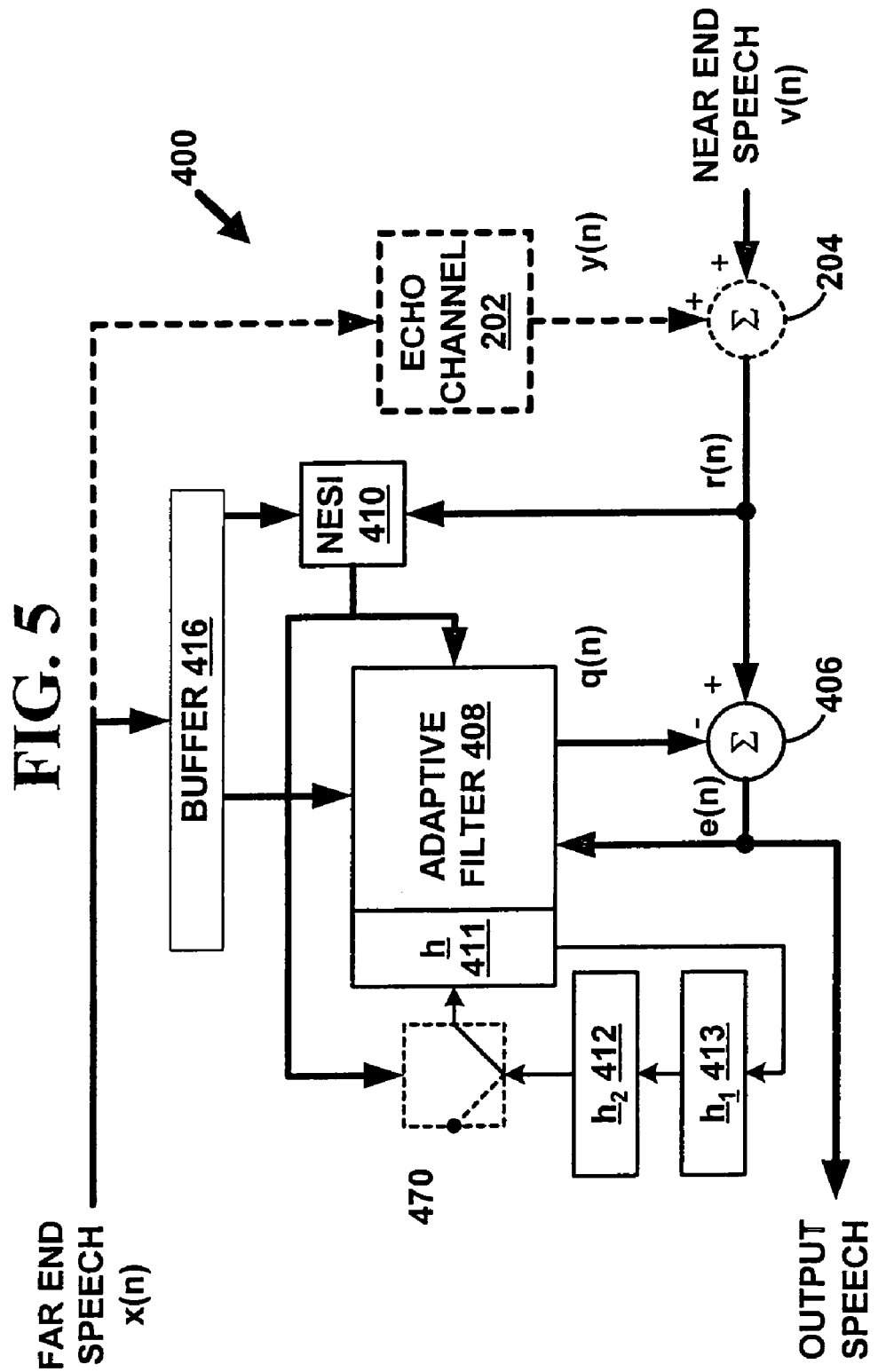
FIG. 5 is a block diagram illustrating a first embodiment of the echo canceller.

FIG. 5 is a block diagram illustrating a first embodiment of the echo canceller, an echo cancellation system or echo canceller 400. Much of the operation of the echo canceller 400 can be further understood with reference to FIGS. 1, 2, and 3. The incoming far end speech signal x(n) enters the unknown Echo Channel 202 in FIG. 5 that represents the entire echo path of the far end speech signal x(n) and that generates and outputs the far end echo signal y(n) from x(n). The characteristic response of the unknown Echo Channel 202 and the values of the far end echo y(n) are not known a priori and must be estimated for effective echo cancellation.

The incoming near end speech signal v(n) is summed with the far end echo signal y(n) at the Summer 204 to produce the signal r(n). Generally, unless both the Far End Speaker 110 and the Near End Speaker 120 of FIG. 1 are talking at the same time (doubletalk), only one of y(n) or v(n) will be present and/or significant relative to the other. The echo cancellation system 400 cancels the echo y(n) out of the signal r(n) so that the Far End Speaker 110 of FIG. 1 does not hear an echo of her own voice.

An Adaptive Filter 408 having an impulse response coefficient vector h 411 generates and outputs a local replica or echo estimate signal q(n) of the far end speaker echo y(n) to cancel the echo y(n) through the unknown echo channel 202 of FIG. 2. The echo estimate signal q(n) is subtracted from the signal r(n) at a subtract input of a Summer 406 to yield an echo residual signal e(n). The echo residual signal e(n) is the output speech of the echo canceller or echo cancellation system 400, although the local replica q(n) generated by the Adaptive Filter 408 might not cancel the far end echo signal v(n) in the signal r(n) completely, requiring some adjustment or noise reduction circuitry to process the echo residual signal e(n).

The incoming far end speech signal x(n) is received in a Buffer 416. Preferably, the Buffer 416 is used in the echo cancellation system 400 shown in FIG. 5. However, other implementations for receiving the far end signal x(n) can be used, including providing a delay line of block delay elements of the type illustrated in the transversal Adaptive Filter 208 of FIG. 3 (such as elements 250 in FIG. 3) to delay individual samples and/or groups of samples of the incoming far end signal x(n).

The Buffer 416 can present individual samples, or entire groups or vectors of samples, or samples that have been operated on, of the incoming far end signal to the Adaptive Filter 408 and a Near End Speech Indicator (NESI) 410 of FIG. 5. Preferably, the Buffer 416 presents the vector $\underline{x}$(n) of the far end signal (as in equation (1)) to the Adaptive Filter 408 and the NESI-410. The Buffer 416 of the preferred embodiment in FIG. 5 is shown as separate from the Adaptive Filter 408, although the Buffer 416 need not be a separate element from the Adaptive Filter 408. Preferably a series of samples longer than the length of any filter used with the Buffer 416 (for example, the length of the Adaptive Filter 408, preferably N) is received into the Buffer 416. Regardless, the Buffer 416 implemented to receive samples of the far end signal x(n) preferably will be at least as long an adaptive filter having length N.

The Adaptive Filter 408 of FIG. 5 receives the incoming far end speech signal x(n), preferably the entire vector $\underline{x}$(n) from the Buffer 416, the echo residual signal e(n), and a control or indication signal from the NESI 410. The Adaptive Filter 408 of FIG. 5, is preferably implemented as an adaptive digital transversal filter, and utilizes a filter tap coefficient vector h 411 to model the impulse response of the unknown Echo Channel 202 so that the echo signal y(n) can be cancelled. When the presence of near end speech is not indicated by the NESI 410, the vector h 411 of echo impulse response coefficients used in the Adaptive Filter 408 is updated according to an algorithm or scheme that extracts information about the unknown echo channel 202 from the signals x(n) and e(n), for example, preferably according to a Least Mean Square algorithm. The coefficients of the coefficient vector h 411 are progressively updated in order to track the characteristics of the unknown echo channel 202.

The NESI 410 provides a control signal that is indicative of the presence of near end speech to the Adaptive Filter 408. Generally, if the NESI 410 indicates the presence of near end speech, adaptation of the transversal Adaptive Filter 408 will be frozen, and the echo impulse response coefficient or filter tap vector h 411 will no longer be updated for the duration of the period that near end speech is indicated.

The NESI 410 also provides a control signal that is indicative of the presence of near end speech to a Switch 470. As shown in FIG. 5, the filter tap coefficient vector h 411 is copied to, or a copy of h 411 is stored to, a second filter coefficient vector $h_1$ 412. The second filter coefficient vector $h_1$ 412 is copied to, or a copy of $h_1$ 412 is stored to, a third filter coefficient vector $h_2$ 413.

The Switch 470 controls recovery or restoration of the third filter coefficient vector $h_2$ 413 to the filter coefficient vector h 411 of the Adaptive Filter 508. In other words, if the Switch 470 is closed, the third filter coefficient vector $h_2$ 413 is copied to, or a copy of $h_2$ 413 is stored to, the first filter coefficient vector h 413. If the NESI 410 indicates the presence of near end speech, the Switch 470 is closed, thus enabling the recovery or the restoration of the third filter coefficient vector $h_2$ 413 to the filter coefficient vector h 411. If the NESI 410 does not indicate the presence of near end speech, the Switch 470 is open, and recovery of the vector $h_2$ 413 to the vector h 411 is not performed.

In addition, if the NESI 410 indicates the presence of near end speech, copies of the filter coefficient vector h 411 will not be made and will not be stored to the coefficient vector $h_1$ 412. If the NESI 410 does not indicate the presence of near end speech, the storing of the copies of the filter coefficient vector h 411 proceeds on a periodic basis.

It should be understood that once a copy is stored to one of the filter coefficient vectors h 411, $h_1$ 412, or $h_2$ 413, the particular copy is retained, held, or stored by the vector in question until such time until a new copy of a vector other than the vector in question is stored to the vector in question and replaces the prior stored or retained copy. If no new copies are stored to the vector in question, the vector retains or holds its current value regardless of whether or not near end speech is present or the presence of such is indicated.

In FIG. 5, the filter coefficient vectors $h_1$ 412, $h_2$ 413 and the Switch 470 are illustrated as being external to the Adaptive Filter 408. Preferably, the vectors $h_1$ 412 and $h_2$ 413 and the Switch 470 are internal to the Adaptive Filter 408 and copies of the vectors are stored, provided, and generated, and transferred to and between the vectors h 411, $h_1$ 412, or $h_2$ 413, by a Coefficient Vector Generator (not shown in FIG. 5) which also generates and updates the vectors h 411.

In other embodiments, an additional buffer or buffers (not shown in FIG. 5) to the Buffer 416 may be used to store copies of the filter coefficient vectors or to serve as the location or locations of the vectors themselves. These buffers need not be located internally to the Adaptive Filter 408, although preferably they are.

Still further, it should be understood that any or all of the Adaptive Filter 408, including the vector h 411, and an internal coefficient vector generator (not shown); the vector $h_1$ 412; the vector $h_2$ 413; the Switch 470; and the NESI 410 can be implemented via digital signal processing that performs the same or similar function or functions and/or on a single digital signal processor.

Preferably, the "second" vector $h_1$ 412 is the only intermediary storage vector between the first "vector" h 411 and the "third" vector $h_2$ 413. However, more vectors than $h_1$ 412 can be used as intermediate storage vectors between the vectors h 411 and $h_2$ 413. Any vectors that do not sacrifice or impede the functional purposes, which include protecting filter coefficients from corruption, filter divergence, and adverse adaptation conditions (despite increasing complexity), of the preferred embodiments are thus contemplated.

Figure 6:
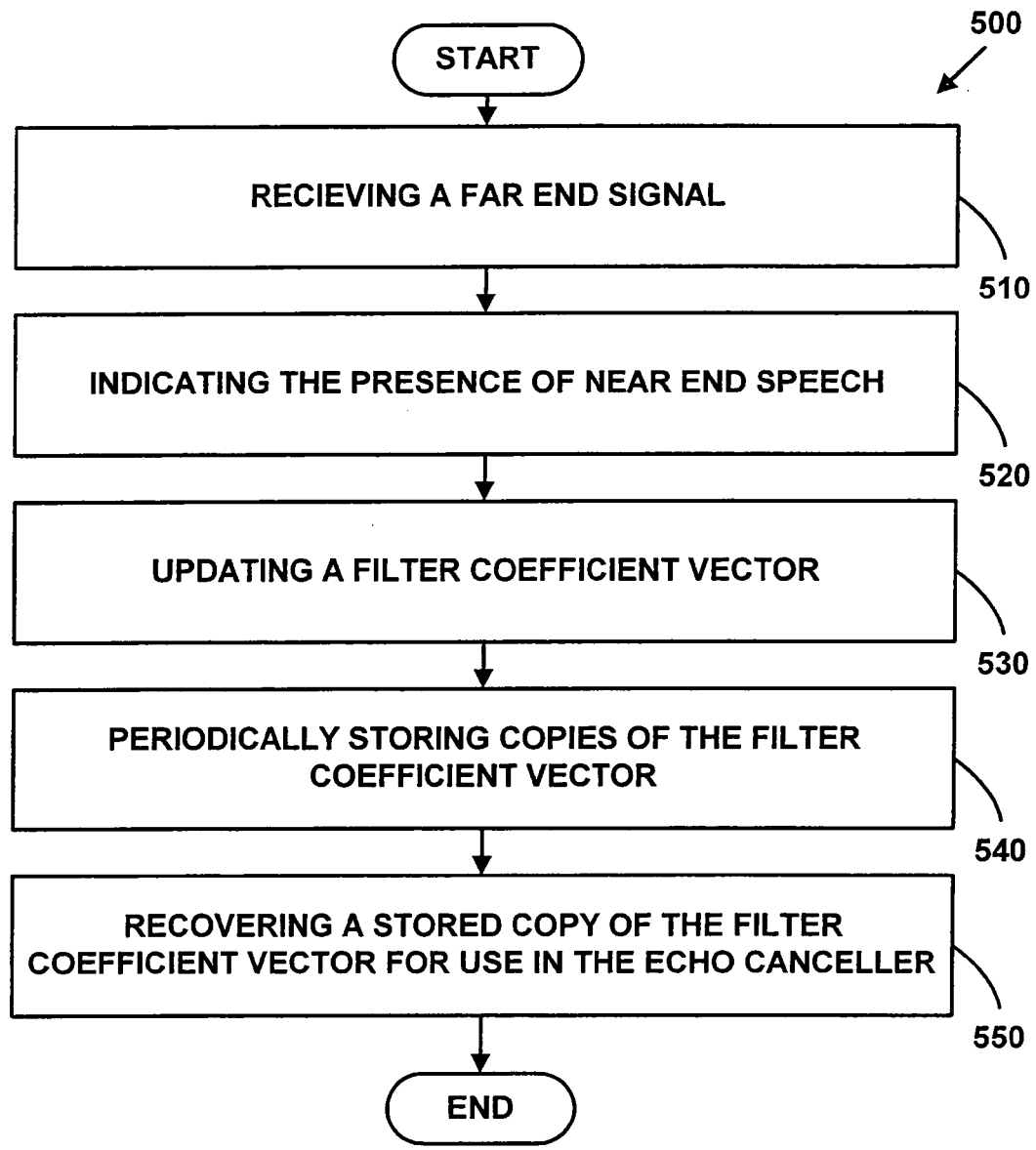
FIG. 6 is a flow diagram illustrating a first method for preventing the corruption of filter coefficients due to near end speech in an echo canceller.

FIG. 6 is a flow diagram illustrating a Method 500 for preventing the corruption of filter coefficients due to near end speech in an echo canceller. The echo canceller uses an adaptive filter to create a local replica of an echo of a far end signal. The Method 500 includes: receiving a far end signal (Step 510); indicating the presence of near end speech (Step 520); updating a filter coefficient vector (Step 530); periodically storing copies of the filter coefficient vector (Step 540); and recovering a stored copy of the filter coefficient vector for use in the echo canceller (Step 550).

At Step 510, a far end signal is received. Preferably, the far end signal is received into a buffer of length N. Preferably the far end signal x(n) is received into the Buffer 416 having length N, as shown in FIG. 5. The far end signal x(n) is preferably received on a sample by sample basis into the Buffer 416. Other implementations for receiving the far end signal x(n) than the Buffer 416 of FIG. 5 can be used with the Method 500, including providing a delay line of block delay elements to delay individual samples and/or groups of samples of the incoming far end signal x(n).

At Step 520, the presence of near end speech is indicated. In a preferred embodiment, the presence of near end speech is detected, indicated or declared by comparing a near end signal and the far end signal utilizing an algorithm according to the condition in equation (4) above.

Whenever the condition of equation (4) is met, the presence of near end speech is indicated.

While comparing the latest value of the combined signal r(n) of FIG. 5 with the maximum sample of a series of delayed or buffered samples of the far end signal x(n) of FIG. 5 is one technique, it is possible to increase the robustness of and ensure the reliability of the near end speech detection. Preferably, instead of the samples of r(n) and x(n), the short term averages of a series of samples of the signals r(n) and x(n) are used in the near end speech indication condition in equation (4). Other near end speech and doubletalk detection techniques exist in the art such as the monitoring of the echo return loss enhancement (ERLE) measurement. Referring to the timing diagrams of FIG. 4, near end speech is indicated within a near end speech indication delay time $t_{tr}$ in preferred embodiments. The question of whether or not the presence of near end speech is or has been indicated may or may not affect certain other steps (Steps 530, 540, and 550) of the Method 500 with respect to how these steps are performed or whether or not they are performed, stopped, paused, or discontinued, as described with particularity below.

It should be understood that indicating the presence of near end speech refers to any process, method, step, or algorithm, however implemented, of indicating, detecting or declaring the presence, existence, or onset of near end speech, a near end speech signal, a "near end speech" state or condition, a "doubletalk" state or condition, or any signal that interferes with the cancellation of far end speaker echo and whose presence requires detection, indication or declaration.

At Step 530, a filter coefficient vector is updated. Preferably, the filter coefficient vector is updated according to a least mean square algorithm. The first filter coefficient vector h 411 is updated, preferably according to a least mean square algorithm. Preferably, the filter coefficient vector is updated with each incoming sample of the received far end signal (at Step 510). Preferably, the filter coefficient vector is updated by the Adaptive Filter 408 to model the echo channel characteristic.

At Step 540, copies of the filter coefficient vector are stored periodically or on a periodic basis. Preferably, the filter coefficient vector and the copies of the filter coefficient vector are of length N. In a preferred embodiment, copies of the filter coefficient vector are stored less frequently than the filter coefficient vector is updated at Step 530. For example, if the filter coefficient vector is updated with each incoming sample of the received far end signal, the copies of the vector could be stored at increments of 20 to 30 updates of the vector. In certain other preferred embodiments, the copies of the filter coefficient vector are stored at time intervals relating to how rapidly near end speech is indicated (at Step 520). For example, the copies could be stored at a series of time intervals $t_n$, wherein $t_n$ is not less than the near end speech indication delay time $t_{tr}$. Referring to FIG. 5, preferably a copy of the second filter coefficient vector $h_1$ is stored periodically or on a periodic basis to the third filter coefficient vector $h_2$. Preferably a copy of the first filter coefficient vector $\underline{h}$ is stored periodically or on a periodic basis to the second filter coefficient vector $h_1$.

The present Method 500 may be implemented according to FIG. 4. The lower portion of FIG. 4 illustrates a timing diagram exhibiting the instants $t_n$ at which copies of the echo impulse response coefficient vector $\underline{h}$ (analogous to vector $\underline{h}$ 411 of FIG. 5) are made or stored by processes of preferred embodiments described herein. These individual copies of the vector $\underline{h}$ 411 are stored, preserved, or protected as coefficient vector copies for potential use by the echo canceller at the onset of near end speech or as the presence of near end speech is indicated (by Step 520).

The Adaptive Filter 408 of FIG. 5 is not immediately disabled and/or the filter tap coefficients are not frozen in time to avoid some corruption and possible divergence due to the near end speech indication delay time $t_{tr}$. A copy that is made of the filter tap coefficient vector $\underline{h}$ 411 at the instant $t_n$ will not necessarily be free of corruption from the near end speech, nor will a copy of vector $\underline{h}$ 411 made at $t_{n-1}$. The copy of the vector h made at $t_{n-2}$, or prior to the onset of the near end speech, will not suffer or experience the effects of the near end speech and can be utilized by the Adaptive Filter 408 to generate the local replica or echo estimate signal q(n) of FIG. 5 for the duration of the near end speech or while near end speech is indicated, detected or declared.

At Step 550, a stored copy of the filter coefficient vector is recovered or restored for use in the echo canceller. A stored copy of the third filter coefficient vector $\underline{h}_2$ is recovered or restored to the first filter coefficient vector h, such as shown in FIG. 5. Preferably, the third filter coefficient vector $\underline{h}_2$ is restored to the second filter coefficient vector $\underline{h}_2$ as well.

Preferably, if near end speech is indicated at Step 520, the Step 530 of updating the filter coefficient vector is not performed, is discontinued, or is paused for the duration of the near end speech indication. Preferably, the Step 540 of periodically storing copies of the filter coefficient vector is not performed or is paused for the duration of the near end speech indication as well. It should be understood that the copies that have already been stored and are being retained at the time of the indication preferably continue to be retained for possibly utilization, recovery, or restoration. Preferably, if near end speech is indicated at Step 520, the Step 550 of recovering a stored copy of the filter coefficient vector for use in the echo canceller is performed, and a stored filter coefficient vector copy is recovered or restored. An additional step (not shown in FIG. 6) is performed if near end speech is indicated. The far end signal (received at Step 500) is filtered, preferably non-adaptively, using the recovered copy of the filter coefficient vector to cancel the echo of the far end signal. Referring to FIG. 5, a stored copy of the third filter coefficient vector $\underline{h}_2$ is recovered or restored to the first filter coefficient vector $\underline{h}$. Preferably, the third filter coefficient vector $\underline{h}_2$ is restored to the second filter coefficient vector $\underline{h}_1$ as well. An additional step (not shown in FIG. 6) is performed with reference to FIG. 5, if near end speech is indicated. The received far end signal is filtered, non-adaptively, using the first filter coefficient vector $\underline{h}$ (which now equivalent to the third filter coefficient vector $\underline{h}_2$) to cancel the echo of the far end signal. According to the first inventive embodiment shown in FIG. 5, the adaptive and non-adaptive filtering steps are preferably performed by the Adaptive Filter 408.

Preferably, if near end speech is not indicated at Step 520, the Step 550 of recovering the stored copy of the filter coefficient vector for use in the echo canceller is not performed or is paused while near end speech is not indicated. Preferably, the Step 530 of updating the filter coefficient vector continues to be performed. An additional step (not shown in FIG. 6) is performed if near end speech is not indicated. The far end signal (received at Step 500) is adaptively filtered using the filter coefficient vector to cancel the echo of the far end signal. According to the first inventive embodiment shown in FIG. 5, the adaptive filtering step is preferably performed by the Adaptive Filter 408.

It should be understood that although the Method 500 has been described with reference to the first embodiment, the echo cancellation system 400, the Method 500 can also be described with reference to, or the steps of the Method 500 can be carried out by, the second embodiment, the echo cancellation system 600 (shown in FIG. 7 and described below).

Figure 7:
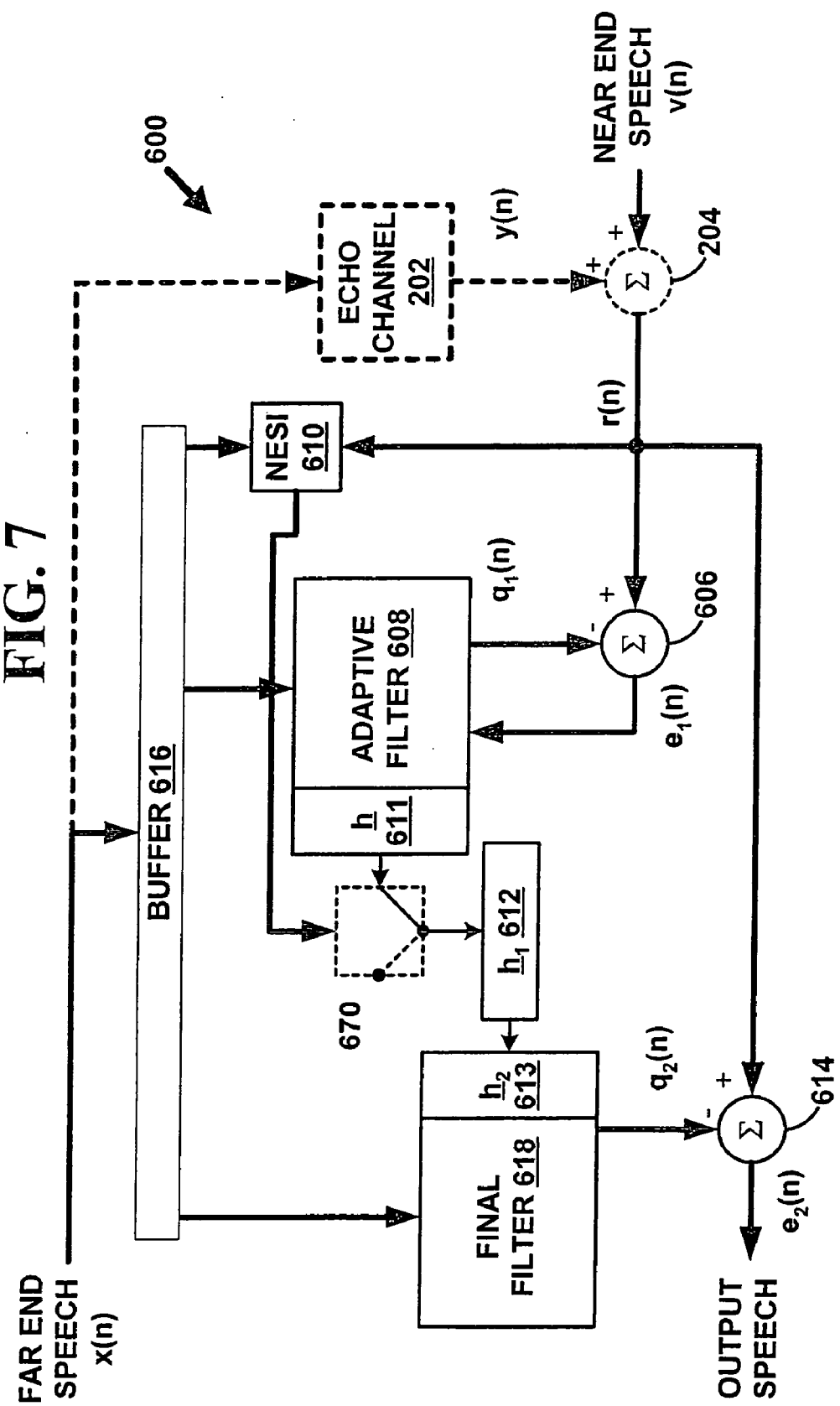
FIG. 7 is a block diagram illustrating a second embodiment of the echo canceller.

FIG. 7 is a block diagram illustrating a second embodiment of the echo canceller, an echo cancellation system or echo canceller 600. Much of the operation of the echo canceller 600 can be further understood with reference to FIGS. 1, 2, and 3. The incoming far end speech signal x(n) enters the unknown Echo Channel 202 in FIG. 7 that represents the entire echo path of the far end speech signal x(n) and that generates and outputs the far end echo signal y(n) from x(n). The characteristic response of the unknown Echo Channel 202 and the values of the far end echo y(n) are not known a priori and must be estimated for effective echo cancellation.

The incoming near end speech signal v(n) is summed with the far end echo signal y(n) at the Summer 204 to produce the signal r(n). Generally, unless both the Far End Speaker 110 and the Near End Speaker 120 of FIG. 1 are talking at the same time (doubletalk), only one of y(n) or v(n) will be present and/or significant relative to the other. The echo cancellation system 600 cancels the echo y(n) out of the signal r(n) so that the Far End Speaker 110 of FIG. 1 does not hear an echo of her own voice.

An Adaptive Filter 608 having an impulse response coefficient vector h 611 generates and outputs a first local replica or estimate signal $q_1(n)$ of the far end speaker echo y(n). The first or preliminary echo estimate signal $q_1(n)$ is subtracted from the signal r(n) at a subtract input of a Summer 606 to yield a first or preliminary echo residual signal $e_1(n)$.

As shown in FIG. 7, the filter tap coefficient vector $\underline{h}$ 611 is copied to, or a copy of $\underline{h}$ 611 is stored to, a second filter coefficient vector $\underline{h}_1$ 612. The second filter coefficient vector $\underline{h}_1$ 612 is in turn copied to, or a copy of $\underline{h}_1$ 612 is stored to, a third filter coefficient vector $\underline{h}_2$ 613.

A Final Filter 618 having the third impulse response coefficient vector $\underline{h}_2$ 613 generates and outputs a second local replica or echo estimate signal $q_2(n)$ of the far end speaker echo $y(n)$ to cancel the echo $y(n)$ through the unknown echo channel 202 of FIG. 7. The second or final echo estimate signal $q_2(n)$ is subtracted from the signal $r(n)$ at a subtract input of a Summer 606 to yield a second or final echo residual signal $e_2(n)$. The second echo residual signal $e_2(n)$ is the output speech of the echo canceller or echo cancellation system 600, although the second local replica $q_2(n)$ generated by the Adaptive Filter 608 might not cancel the far end echo signal $y(n)$ in the signal $r(n)$ completely, requiring some adjustment or noise reduction circuitry to process the second echo residual signal $e_1(n)$.

It should be understood that the Final Filter 618 of the preferred embodiment in FIG. 7 is shown as separate from the Adaptive Filter 608, although the Final Filter 618 need not be a separate from the Adaptive Filter 608. In other embodiments, the two filters 608 and 618 can be implemented via digital signal processing that performs the same or a similar function as the filters 608 and 618 and/or on a single digital signal processor.

The incoming far end speech signal $x(n)$ is received in a Buffer 616. Preferably, the Buffer 616 is used in the echo cancellation system 600 shown in FIG. 7. However, other implementations for receiving the far end signal $x(n)$ can be used, including providing a delay line of block delay elements of the sort illustrated in the transversal Adaptive Filter 208 of FIG. 3 (such as elements 250 in FIG. 3) to delay individual samples and/or groups of samples of the incoming far end signal $x(n)$.

The Buffer 616 can present individual samples, or entire groups or vectors of samples, or samples that have been operated on, of the incoming far end signal to the Adaptive Filter 608, the Final Filter 618, and a Near End Speech Indicator (NESI) 610 of FIG. 7. Preferably, the Buffer 616 presents the vector $x(n)$ of the far end signal (as in equation (1)) to the Adaptive Filter 608, the Final Filter 618, and the NESI 610. The Buffer 616 of the preferred embodiment in FIG. 7 is shown as separate from the Adaptive Filter 608, although the Buffer 616 need not be a separate element from the Adaptive Filter 608. Likewise, the Buffer 616 of the preferred embodiment in FIG. 7 is shown as separate from the Final Filter 618, although the Buffer 616 need not be a separate element from the Final Filter 618. Preferably a series of samples longer than the length of any filter used with the Buffer 616 (for example, the length of the Adaptive Filter 608, preferably N, or the length of the Final Filter 618, preferably N) is received into the Buffer 616.

Regardless, the Buffer 616 implemented to receive samples of the far end signal $x(n)$ preferably will be at least as long an adaptive or other filter having length N.

The Adaptive Filter 608 of FIG. 7 receives the incoming far end speech signal $x(n)$, preferably the entire vector $\underline{x}(n)$ from the Buffer 616, as well as the first echo residual signal $e_1(n)$. The Adaptive Filter 608 of FIG. 7, is preferably implemented as an adaptive digital transversal filter, and utilizes a filter tap coefficient vector $\underline{h}$ 611 to model the impulse response of the unknown Echo Channel 202 so that the echo signal $y(n)$ can be cancelled. The vector $\underline{h}$ 611 of echo impulse response coefficients used in the Adaptive Filter 608 is updated according to an algorithm or scheme that extracts information about the unknown echo channel 202 from the signals $x(n)$ and $e_1(n)$, for example, preferably according to a Least Mean Square algorithm. The coefficients of the coefficient vector $\underline{h}$ 611 are progressively updated in order to track the characteristics of the unknown echo channel 202. Regardless of what conditions are present, (i.e. the presence of near end speech), the Adaptive Filter 608 continues to adapt and to update the vector $\underline{h}$ 611. That is, adaptation of the transversal Adaptive Filter 608 is never stopped or frozen, even if near end speech is indicated.

Similarly, the Final Filter 618 always uses the third impulse response coefficient vector $\underline{h}_2$ 613 to generate and output a second local replica or echo estimate signal $q_2(n)$ of the far end speaker echo $y(n)$ to cancel the echo $y(n)$ through the unknown echo channel 202 of FIG. 2, regardless of whether near end speech is indicated.

As noted above and shown in FIG. 7, the filter tap coefficient vector $\underline{h}$ 611 is copied to, or a copy of $\underline{h}$ 611 is stored to, a second filter coefficient vector $\underline{h}_1$ 612. The second filter coefficient vector $\underline{h}_1$ 612 is copied to, or a copy of $\underline{h}_1$ 612 is stored to, a third filter coefficient vector $\underline{h}_2$ 613.

The NESI 610 provides a control signal that is indicative of the presence of near end speech to a Switch 670. The Switch 670 controls the storing of copies, or the copying, of the filter coefficient vector h 611 to the second filter coefficient vector $\underline{h}_1$ 612. In other words, if the Switch 670 is closed, the filter coefficient vector $\underline{h}$ 611 is copied to, or a copy of $\underline{h}$ 611 is stored to, the second filter coefficient vector $\underline{h}_1$, 612. If the NESI 610 does not indicate the presence of near end speech, the Switch 670 is closed, thus enabling the storing of copies, or the copying of the filter coefficient vector $\underline{h}$ 611 to the second filter coefficient vector $\underline{h}_1$, 612. If the NESI 610 indicates the presence of near end speech, the Switch 670 is open, thus the storing of copies, or the copying of the vector $\underline{h}$ 611 to the vector $\underline{h}_1$ 612 is not performed, or is disabled.

In addition, if the NESI 610 indicates the presence of near end speech, copies of the second filter coefficient vector $\underline{h}_1$ 612 will not be made and will not be stored to the third coefficient vector $\underline{h}_2$ 613. If the NESI 610 does not indicate the presence of near end speech, the storing of the copies of the filter coefficient vector $\underline{h}_1$ 612 proceeds on a periodic basis.

It should be understood that once a copy is stored to one of the filter coefficient vectors $\underline{h}$ 611, $\underline{h}_1$ 612, or $\underline{h}_2$ 613, the particular copy is retained, held, or stored by the vector in question until such time until a new copy of a vector other than the vector in question is stored to the vector in question and replaces the prior stored or retained copy. If no new copies are stored to the vector in question, the vector retains or holds its current value regardless of whether or not near end speech is present or the presence of such is indicated.

If near end speech has been indicated, the Final Filter 618 continues to use the third impulse response coefficient vector $\underline{h}_2$ 613, as always, to generate and output a second local replica or echo estimate signal $q_2(n)$ of the far end speaker echo $y(n)$ to cancel the echo $y(n)$ through the unknown echo channel 202 of FIG. 7.

In FIG. 7, the filter coefficient vectors $h_1$ 612 and the Switch 670 are illustrated externally to the Adaptive Filter 608 and the Final Filter 618. Preferably, the vector $h_1$ 612 and the Switch 670 is internal to the Adaptive Filter 608 (although the Final Filter 613 could also be used) and copies of the vectors are transferred to and between Filters 608 and 613 and the as vectors $\underline{h}$ 611 and $\underline{h}_1$ 612 and/or $\underline{h}_1$ 612 and $\underline{h}_2$ 613, by coefficient vector generator (not shown in FIG. 7)

located internally to the Adaptive Filter 608 which also generates and updates the vectors $\underline{h}$ 611.

In other embodiments, an additional buffer or buffers (not shown in FIG. 7) to the Buffer 616 may be used to store copies of the filter coefficient vectors or to serve as the location or locations of the vectors themselves. These buffers need not be located internally to the Adaptive Filter 608 (or the Final Filter 618), although preferably they are.

Still further, it should be understood that any or all of the Adaptive Filter 608, including the vector $\underline{h}$ 611, and an internal coefficient vector generator (not shown); the vector $\underline{h}_1$ 612; the Final Filter 618, including the vector $\underline{h}_2$ 613; the Switch 670; and the NESI 610 can be implemented via digital signal processing that performs the same or similar function or functions and/or on a single digital signal processor.

Preferably, the "second" vector $\underline{h}_1$ 612 is the only intermediary storage vector between the first "vector" $\underline{h}$ 611 and the "third" vector $\underline{h}_2$ 613. However, more vectors than $\underline{h}_1$ 612 can be used as intermediate storage vectors between the vectors $\underline{h}$ 611 and $\underline{h}_2$ 613. Any additional vectors that do not sacrifice or impede the functional purposes, which include protecting filter coefficients from corruption, filter divergence, and adverse adaptation conditions (despite increasing complexity), of the preferred embodiments are thus contemplated.

FIG. 8 is a flow diagram illustrating a Method 700 for preventing the corruption of filter coefficients due to near end speech in an echo canceller. The echo canceller uses more than one filter, preferably two filters, to create a local replica of an echo of a far end signal. The Method 700 includes: receiving a far end signal (Step 710); indicating the presence of near end speech (Step 720); updating a filter coefficient vector (Step 730); adaptively filtering the far end signal using the filter coefficient vector in order to generate a preliminary local replica of the echo of the far end signal to update the filter coefficient vector (Step 740); periodically storing copies of the filter coefficient vector (Step 750); and filtering the far end signal using a stored copy of the filter coefficient vector to cancel the echo of the far end signal (Step 760).

At Step 710, a far end signal is received. Preferably, the far end signal is received into a buffer of length N. Referring to FIG. 7, preferably the far end signal x(n) is received into the Buffer 616 having length N. The far end signal x(n) is preferably received on a sample by sample basis into the Buffer 616. Other implementations for receiving the far end signal x(n) than the Buffer 616 of FIG. 7 can be used with the Method 700, including providing a delay line of block delay elements to delay individual samples and/or groups of samples of the incoming far end signal x(n).

At Step 720, the presence of near end speech is indicated. In a preferred embodiment the presence of near end speech is detected, indicated or declared by comparing a near end signal and the far end signal utilizing an algorithm according to the condition in equation (4) above. Whenever the condition of equation (4) is met, the presence of near end speech is indicated. While comparing the latest value of the combined signal r(n) of FIG. 7 with the maximum sample of a series of delayed or buffered samples of the far end signal x(n) of FIG. 7 is one technique, it is possible to increase the robustness of and ensure the reliability of the near end speech detection. Preferably, instead of the samples of r(n) and x(n), the short term averages of a series of samples of the signals r(n) and x(n) are used in the near end speech indication condition in equation (4). Other near end speech and doubletalk detection techniques exist in the art such as the monitoring of the echo return loss enhancement (ERLE) measurement. Referring to the timing diagrams of FIG. 4, near end speech is indicated within a near end speech indication delay time $t_{tr}$ in preferred embodiments. The question of whether or not the presence of near end speech is or has been indicated may or may not affect certain other steps (Steps 730, 740, 750 and 760) of the Method 700 with respect to how these steps are performed or whether or not they are performed, stopped, paused, or discontinued, as described with particularity below.

It should be understood that indicating the presence of near end speech refers to any process, method, step, or algorithm, however implemented, of indicating, detecting or declaring the presence, existence, or onset of near end speech, a near end speech signal, a "near end speech" state or condition, a "doubletalk" state or condition, or any signal that interferes with the cancellation of far end speaker echo and whose presence requires detection, indication or declaration.

At Step 730, a filter coefficient vector is updated. Preferably, the filter coefficient vector is updated according to a least mean square algorithm. Referring to FIG. 7, the first filter coefficient vector $\underline{h}$ 611 is updated, preferably according to a least mean square algorithm. Preferably, the filter coefficient vector is updated with each incoming sample of the received far end signal (at Step 710). Preferably, the filter coefficient vector is updated by the Adaptive Filter 608 to model the echo channel characteristic.

At Step 740, the far end signal is adaptively filtered using the filter coefficient vector in order to generate a preliminary local replica of the echo of the far end signal to update the filter coefficient vector (at Step 740). Referring to the second embodiment, shown in FIG. 7, the far end signal x(n) is adaptively filtered, preferably, by the Adaptive Filter 608 using the first filter coefficient vector $\underline{h}$ in order to generate a preliminary local replica $q_1(n)$ of the echo of the far end signal to update the first filter coefficient vector $\underline{h}$.

At Step 750, copies of the filter coefficient vector are stored periodically or on a periodic basis. Preferably, the filter coefficient vector and the copies of the filter coefficient vector are of length N. In a preferred embodiment, copies of the filter coefficient vector are stored less frequently than the filter coefficient vector is updated at Step 730. For example, if the filter coefficient vector is updated with each incoming sample of the received far end signal, the copies of the vector could be stored at increments of 20 to 30 updates of the vector, or at every 20 to 30 received samples of the far end signal (at Step 710). In certain other preferred embodiments, the copies of the filter coefficient vector are stored at time intervals relating to how rapidly near end speech is indicated (at Step 720). For example, the copies could be stored at a series of time intervals $t_n$, wherein $t_n$ is not less than the near end speech indication delay time $t_{tr}$. Referring to FIG. 7, preferably a copy of the second filter coefficient vector $\underline{h}_1$ is stored periodically or on a periodic basis to the third filter coefficient vector $\underline{h}_2$. Preferably a copy of the first filter coefficient vector $\underline{h}$ is stored periodically or on a periodic basis to the second filter coefficient vector $\underline{h}_1$.

The lower portion of FIG. 4 illustrates a timing diagram exhibiting the instants $t_n$ at which copies of the echo impulse response coefficient vector $\underline{h}$ (analogous to vector $\underline{h}$ 611 of FIG. 7) are made or stored by processes of the preferred embodiments described herein. These individual copies of the vector $\underline{h}$ 611 are stored, preserved, or protected as coefficient vector copies for potential use by the echo canceller at the onset of near end speech or as the presence of near end speech is indicated (by Step 720).

Referring to the preferred embodiment shown in FIG. 7, the Adaptive Filter 608 always adapts and updates the first coefficient vector h at Step 730, regardless of whether or not near end speech is indicated. Therefore, the Adaptive Filter 608 of FIG. 7 is never disabled and the filter tap coefficients are never frozen in time to avoid corruption and possible divergence due to the presence of near end speech. The filter tap coefficient vector h 611 will never be free of potential corruption from any near end speech that is present, since it is always updated. However, copies of the vector h made prior to the onset of the near end speech, such as the copy of the vector h made at $t_{n-2}$, will not suffer or experience the effects of the near end speech and can be utilized by the Final Filter 618 to generate the second or final local replica or echo estimate signal $q_2(n)$ of FIG. 7, preferably at all times, regardless of whether or not near end speech indicated, detected or declared.

At Step 760, the far end signal is filtered using a stored copy of the filter coefficient vector to cancel the echo of the far end signal. Referring to FIG. 7, the far end signal x(n) is filtered, preferably by the Final Filter 618, using the third filter coefficient vector $h_2$ to cancel the echo y(n) of the far end signal. Preferably, the third filter coefficient vector h2 is used at all times to non-adaptive filter the far end signal x(n) to generate and output the second or final local replica or echo estimate signal $q_2(n)$. Preferably, the vector $h_2$ is a copy of the updated vector h, copied at times when near end speech is not indicated, or at times prior to the indication of near end speech, at Step 720, so that the vector $h_2$ is always protected and not corrupted by near end speech.

Preferably, if near end speech is indicated at Step 720, the Step 750 of periodically storing copies of the filter coefficient vector is not performed, is discontinued, or is paused for the duration of the near end speech indication. It should be understood that the copies that have already been stored and are being retained at the time of the indication preferably continue to be retained for possible utilization, recovery, and/or restoration.

Preferably, if near end speech is not indicated at Step 720, the Step 750 of periodically storing copies of the filter coefficient vector continues to be performed.

It should be understood that although the Method 700 can be described with reference to the second embodiment, the echo cancellation system 600, the Method 700 can also be described with reference to, or the Steps of the Method 700 can be carried out by, the first embodiment, the echo cancellation system 400 (shown in FIG. 5 and described above).

An operating environment for the Methods 500, 700. the Systems 400, 600 and the described embodiments includes a processing system with at least one high speed Central Processing Unit ("CPU") or other processing unit and a memory system. In accordance with the practices of persons skilled in the art of computer programming, the present invention is described below with reference to acts and symbolic representations of operations or instructions that are performed by the processing system, unless indicated otherwise. Such acts and operations or instructions are sometimes referred to as being "computer-executed", or "CPU executed."

It will be appreciated that the acts and symbolically represented operations or instructions include the manipulation of electrical signals by the CPU. An electrical system with data bits causes a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the CPU or other processing unit. The computer readable medium includes cooperating or interconnected computer readable media, which exist exclusively on the processing system or are distributed among multiple interconnected processing systems that may be local or remote to the processing system. In particular, the Methods 500 and 700 of the present invention and any and all embodiments thereof can be executed by a processing unit in response to, or responsively to, instructions stored in or on a computer readable medium.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the Steps of the flow diagrams may be taken in sequences other than those described, and more or fewer elements or components may be used in the block diagrams. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

The invention claimed is:

1. In an echo canceller that uses an adaptive filter to create a local replica of an echo of a far end signal, a method for preventing the corruption of filter coefficients due to near end speech comprising the steps of:
   receiving a far end signal;
   indicating the presence of near end speech:
   updating a filter coefficient vector;
   periodically storing copies of the filter coefficient vector; and
   recovering a stored copy of the filter coefficient vector for use in the echo canceller to cancel the echo of the far end signal;
   wherein if near end speech is indicated, the step of updating the filter coefficient vector is not performed
   and wherein if near end speech is indicated, the step of periodically storing copies of the filter coefficient vector is not performed.

2. The method of claim 1, wherein if near end speech is indicated, a stored copy of the filter coefficient vector is recovered for use in the echo canceller.

3. The method of claim 2, further comprising the step of:
   if near end speech is indicated, filtering the far end signal using the recovered copy of the filter coefficient vector to cancel the echo of the far end signal.

4. The method of claim 1, further comprising the step of:
   if near end speech is indicated, filtering the far end signal using the recovered copy of the filter coefficient vector to cancel the echo of the far end signal.

5. The method of claim 1 wherein near end speech is indicated according to:

$$|r(n)| \geq \frac{1}{2}\max\{|x(i)|, |x(i-1)|, \ldots, |x(i-N+1)|\},$$

wherein r(n) is a short term average of a series of samples of a near end signal, x(i) is a short term average of a series of samples of the far end signal, and N is the length of a buffer, wherein the buffer receives the far end signal.

6. The method of claim 1 wherein near end speech is indicated within a near end speech indication delay time $t_{tr}$.

7. The method of claim 1 wherein copies of the filter coefficient vector are stored less frequently than the filter coefficient vector is updated.

8. The method of claim 1 wherein copies of the filter coefficient vector are stored at time intervals relating to how rapidly near end speech is indicated.

9. The method of claim 1 wherein copies of the filter coefficient vector are stored at a series of time intervals $t_n$, wherein $t_n$ is not less than the near end speech indication delay time $t_{tr}$.

10. In an echo canceller that uses more than one filter to create a local replica of an echo of a far end signal, a method for preventing the corruption of filter coefficients due to near end speech comprising the steps of:
   receiving a far end signal;
   indicating the presence of near end speech;
   updating a filter coefficient vector;
   adaptively filtering the far end signal using the filter coefficient vector in order to generate a preliminary local replica of the echo of the far end signal to update the filter coefficient vector;
   periodically storing copies of the filter coefficient vector; and
   filtering the far end signal using a stored copy of the filter coefficient vector to cancel the echo of the far end signal;
   wherein near end speech is indicated according to:

$$|r(n)| \geq \frac{1}{2}\max\{|x(i)|, |x(i-1)|, \ldots, |x(i-N+1)|\},$$

wherein r(n) is a short term average of a series of samples of a near end signal, x(i) is a short term average of a series of samples of the far end signal, and N is the length of a buffer, wherein the buffer receives the far end signal.

11. The method of claim 10, wherein near end speech is indicated within a near end speech indication delay time $t_{tr}$.

12. The method of claim 11 wherein copies of the filter coefficient vector are stored at a series of time intervals $t_n$, wherein $t_n$ is not less than the near end speech indication delay time $t_{tr}$.

13. The method of claim 10, wherein copies of the filter coefficient vector are stored less frequently than the filter coefficient vector is updated.

14. The method of claim 10, wherein copies of the filter coefficient vector are stored at time intervals relating to how rapidly near end speech is indicated.

15. In an echo canceller that uses an adaptive filter to create a local replica of an echo of a far end signal, a method for preventing the corruption of filter coefficients due to near end speech comprising the steps of:
   receiving a far end signal;
   updating a first filter coefficient vector h;
   periodically storing a copy of a second filter coefficient vector $h_1$ to a third filter coefficient vector $h_2$;
   periodically storing a copy of the first filter coefficient vector h to the second filter coefficient vector $h_1$;
   indicating the presence of near end speech, wherein if near end speech is indicated,
      discontinuing the updating and the periodic storing steps;
      recovering a stored copy of the third filter coefficient vector $h_2$ to the first filter coefficient vector h and to the second filter coefficient vector $h_1$; and
   filtering the far end signal using the first filter coefficient vector h to cancel the echo of the far end signal.

16. A computer readable medium having stored therein instructions for causing a processing unit to execute the method of claim 15.

17. The method of claim 15 wherein the first coefficient vector h is updated according to a least mean square algorithm.

18. In an echo canceller that uses more than one filter to create a local replica of an echo of a far end signal, a method for preventing the corruption of filter coefficients due to near end speech comprising the steps of:
   receiving a far end signal;
   updating a first filter coefficient vector h;
   adaptively filtering the far end signal using the first filter coefficient vector h in order to generate a preliminary local replica of the echo of the far end signal to update the first filter coefficient vector h;
   periodically storing a copy of a second filter coefficient vector $h_1$ to a third filter coefficient vector $h_2$;
   periodically storing a copy of the first filter coefficient vector h to the second filter coefficient vector $h_1$;
   indicating the presence of near end speech, wherein if near end speech is indicated,
      discontinuing the periodic storing steps;
   filtering the far end signal using the third filter coefficient vector $h_2$ to cancel the echo of the far end signal.

19. A computer readable medium having stored therein instructions for causing a processing unit to execute the method of claim 18.

20. The method of claim 18 wherein the first coefficient vector h is updated according to a least mean square algorithm.

* * * * *